United States Patent
Deng et al.

(10) Patent No.: US 9,104,080 B2
(45) Date of Patent: Aug. 11, 2015

(54) LIQUID CRYSTAL DISPLAY

(71) Applicant: SHENZHEN CHINA STAR OPTOELECTRONICS TECHNOLOGY CO., LTD., Shenzhen, Guangdong (CN)

(72) Inventors: Mingfeng Deng, Guangdong (CN); Jungmao Tsai, Guangdong (CN); Yizhuang Zhuang, Guangdong (CN); Songxian Wen, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 382 days.

(21) Appl. No.: 13/820,923

(22) PCT Filed: Dec. 19, 2012

(86) PCT No.: PCT/CN2012/086940
§ 371 (c)(1),
(2) Date: Mar. 5, 2013

(87) PCT Pub. No.: WO2014/089860
PCT Pub. Date: Jun. 19, 2014

(65) Prior Publication Data
US 2014/0168594 A1    Jun. 19, 2014

(30) Foreign Application Priority Data
Dec. 13, 2012    (CN) .......................... 2012 1 0538843

(51) Int. Cl.
*G02F 1/13*    (2006.01)
*G02F 1/1362*    (2006.01)

(52) U.S. Cl.
CPC .................. *G02F 1/136259* (2013.01); *G02F 2001/136254* (2013.01); *G02F 2001/136263* (2013.01)

(58) Field of Classification Search
CPC .................................................. G02F 1/136263
USPC .......................................................... 349/192
See application file for complete search history.

(56) References Cited

U.S. PATENT DOCUMENTS

2009/0115959 A1* 5/2009 Lee et al. ....................... 349/192
2010/0188594 A1* 7/2010 Qian ............................... 349/54

FOREIGN PATENT DOCUMENTS

CN    1845328 A    10/2006
CN    101561983 A    10/2009
(Continued)

OTHER PUBLICATIONS

Search Report issued in International Patent Application No. PCT/CN2012/086940 issued on Sep. 26, 2013, 13 pages.

*Primary Examiner* — Timothy L Rude
(74) *Attorney, Agent, or Firm* — Nath, Goldberg & Meyer; Jerald L. Meyer

(57) ABSTRACT

The present disclosure provides a liquid crystal display, including at least one repairing line, a short circuit bar area, a number of data line pads, a number of testing lines for connecting short circuit bars on the short circuit bar area and the data line pads, a wiring area, a displaying area, and a number of data lines passing through the wiring area and the displaying area; first ends of the data lines being electrically connected to the data line pads and second ends of the data lines extending to be located under the displaying area; the repairing line comprising a first portion isolably intersecting with the testing lines, a second portion isolably intersecting with the second ends of the data lines, and a third portion connecting the first portion and the second portion in the repairing of a disconnected line.

14 Claims, 2 Drawing Sheets

(56) References Cited

FOREIGN PATENT DOCUMENTS

| CN | 101561983 B | 10/2009 |
| CN | 102067198 A | 5/2011 |
| JP | 2000105576 A | 4/2000 |
| JP | 2001005027 A | 1/2001 |

* cited by examiner

LIQUID CRYSTAL DISPLAY

BACKGROUND

1. Technical Field

The present disclosure relates to liquid crystal displaying technologies, and particularly, to a liquid crystal display.

2. Description of Related Art

With the development of electrical technologies, flat displays such as liquid crystal displays, plasma displays, and OLED (Organic Light-Emitting Diode) displays have gained rapid development. Among the flat displays, the liquid crystal displays are commonly used due to advantages including light weight, small volume, and low power consumption.

At present, a liquid crystal panel of a liquid crystal display generally forms a wiring area, a displaying area, and includes a number of data lines passing through the displaying area and the wiring area, a number of scanning lines, and at least one repairing line for repairing a disconnected data line. Generally, each of the repairing line includes a first portion, a second portion, and a third portion. The first portion is arranged between the wiring area and the displaying area, and is perpendicular to the data lines. The second portion is arranged under the displaying area and is perpendicular to the data lines. The third portion is arranged at a right side of the displaying area for connecting the first portion and the second portion. However, the position of the repairing line decides that the repairing line can only be used for repairing the disconnected data line on the displaying area instead of the disconnected data line on the wiring area. However, the reason way the repairing line is arranged between the wiring area and the displaying area is that, the data lines outside the wiring area are arranged on one layer and the data lines on the wiring area are arranged on two layers in order to reduce the transmission loss of the signals. The repairing line and the scanning lines on the displaying area can be formed in the same photomask process. Additional, an additional photomask process may be required if the repairing line is arranged on the wiring area, which greatly increases the manufacturing cost of the liquid crystal display. However, without the arrangement of the repairing line on the wiring area, the repairing of the disconnected data line on the wiring area cannot be finished.

SUMMARY

The present disclosure provides a liquid crystal display which can realize the repairing of a disconnected data line on the displaying area and the wiring area of the liquid crystal panel of the liquid crystal display without greatly increasing the manufacturing cost of the liquid crystal display.

The present disclosure provides a liquid crystal display, including at least one repairing line, a short circuit bar area, a number of data line pads, a number of testing lines for connecting short circuit bars on the short circuit bar area and the data line pads, a wiring area, a displaying area, and a number of data lines passing through the wiring area and the displaying area. First ends of the data lines are electrically connected to the data line pads and second ends of the data lines extending to be located under the displaying area. The repairing line includes a first portion isolably intersecting with the testing lines, a second portion isolably intersecting with the second ends of the data lines, and a third portion connecting the first portion and the second portion in the repairing of a disconnected line.

Preferably, the liquid crystal display further includes a printed circuit board, a data driving chip, and a first flexible circuit board, and the data driving chip is electrically connected to the printed circuit board and the data line pads through the first flexible circuit board.

Preferably, the liquid crystal display further includes an empty testing line, a first empty data line pad, and a second empty data line pad; the first empty data line pad is electrically connected to the empty testing line; the first portion of the repairing line isolably intersects with the testing lines and the empty testing line, the third portion includes a first connecting line, a second connecting line, a third connecting line, a fourth connecting line, and a fifth connecting line; the first connecting line and the second connecting line are respectively arranged on the first flexible circuit board, and the third connecting line and the fourth connecting line are respectively arranged on the printed circuit board; the first connecting line is connected to the first empty data line pad and the third connecting line through the first flexible circuit board, the second connecting line is connected to the second empty data line pad and the fourth connecting line through the first flexible circuit board, the third connecting line is connected to the fourth connecting line through a signal amplifier on the printed circuit board, and one end of the fifth connecting line is connected to the second empty data line pad and the other end thereof is connected to the second portion of the repairing line.

Preferably, the first portion and the second portion of the repairing line are parallel to the scanning lines, and the fifth connecting line of the third portion is parallel to the data lines.

Preferably, the first portion and the second portion of the repairing line and the scanning lines are formed in a same photomask process, the third portion and the data lines outside the displaying area are formed in the same photomask process, and the third portion connects the first portion and the second portion by forming through holes.

Preferably, the first portion, the second portion, and the third portion of the repairing line are formed in the same photomask process as the scanning lines, and the third portion connects the first portion and the second portion directly.

Preferably, the data lines on the wiring area are arranged on two metal layers, and the data lines outside of the wiring area are arranged on one metal layer.

The present disclosure further provide another liquid crystal display, including at least repairing line, a short circuit bar area, a number of data line pads, a number of testing lines for connecting short circuit bars on the short circuit bar area and the data line pads on in test, a wiring area, a displaying area, a number of data lines passing through the wiring area and the displaying area. First ends of the data lines are electrically connected to the data line pads and second ends of the data lines extending to be located under the displaying area. The repairing line includes a first portion isolably intersecting with the testing lines, a second portion isolably intersecting with the second ends of the data lines, and a third portion connecting the first portion and the second portion. The liquid crystal display further includes at least one displaying area repairing line includes a fourth portion, a fifth portion isolably intersecting with the second ends of the data lines, and a six portion connecting the fourth portion and the fifth portion in repairing; the fourth portion being arranged between the wiring area and the displaying area and isolably intersecting with the data lines.

Preferably, the liquid crystal display further includes a printed circuit board, a data driving chip, and a first flexible circuit board, and the data driving chip is electrically connected to the printed circuit board and the data lines through the first flexible circuit board.

Preferably, the liquid crystal display further includes an empty testing line, a first empty data line pad, and a second empty data line pad; the first empty data line pad is electrically connected to the empty testing line; the first portion of the repairing line isolably intersects with the testing lines and the empty testing line; the third portion includes a first connecting line, a second connecting line, a third connecting line, a fourth connecting line, and a fifth connecting line; the first connecting line and the second connecting line are respectively arranged on the first flexible circuit board, the third connecting line and the fourth connecting line are respectively arranged on the printed circuit board, the first connecting line is connected to the first empty data line pad and the third connecting line through the first flexible circuit board, the second connecting line is connected to the second empty data line pad and the fourth connecting line through the first flexible circuit board, the third connecting line is connected to the fourth connecting line through a signal amplifier on the printed circuit board; and one end of the fifth connecting line is connected to the second empty data line pad and the other end thereof is connected to the second portion of the repairing line.

Preferably, the first portion and the second portion of the repairing line are parallel to the scanning lines, and the fifth connecting line of the third portion is parallel to the data lines.

Preferably, the first portion and the second portion of the repairing line and the scanning lines are formed in a same photomask process, the third portion and the data lines outside the displaying area are formed in the same photomask process, and the third portion connects the first portion and the second portion by forming through holes.

Preferably, the first portion, the second portion, and the third portion of the repairing line are formed in the same photomask process as the scanning lines, and the third portion connects the first portion and the second portion directly.

Preferably, the data lines on the wiring area are arranged on two metal layers, and the data lines outside of the wiring area are arranged on one metal layer.

Compared to the liquid crystal display of the related art, the repairing line of the liquid crystal display of the present disclosure includes the first portion isolably intersecting with the testing lines, the second portion isolably intersecting with the second ends of the data lines, and the third portion connecting the first portion and the second portion when repairing the disconnected line, thus, not only the data lines on the wiring area of the liquid crystal panel can be repaired, but also the data lines on the displaying area of the liquid crystal panel can be repaired. Additionally, the repairing line and the data lines on the wiring area are located at different positions, which allows the repairing line to be formed in the same photomask process as the scanning lines or data lines on the displaying area without requiring for extra photomask processes and without greatly increasing the cost of the liquid crystal display.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
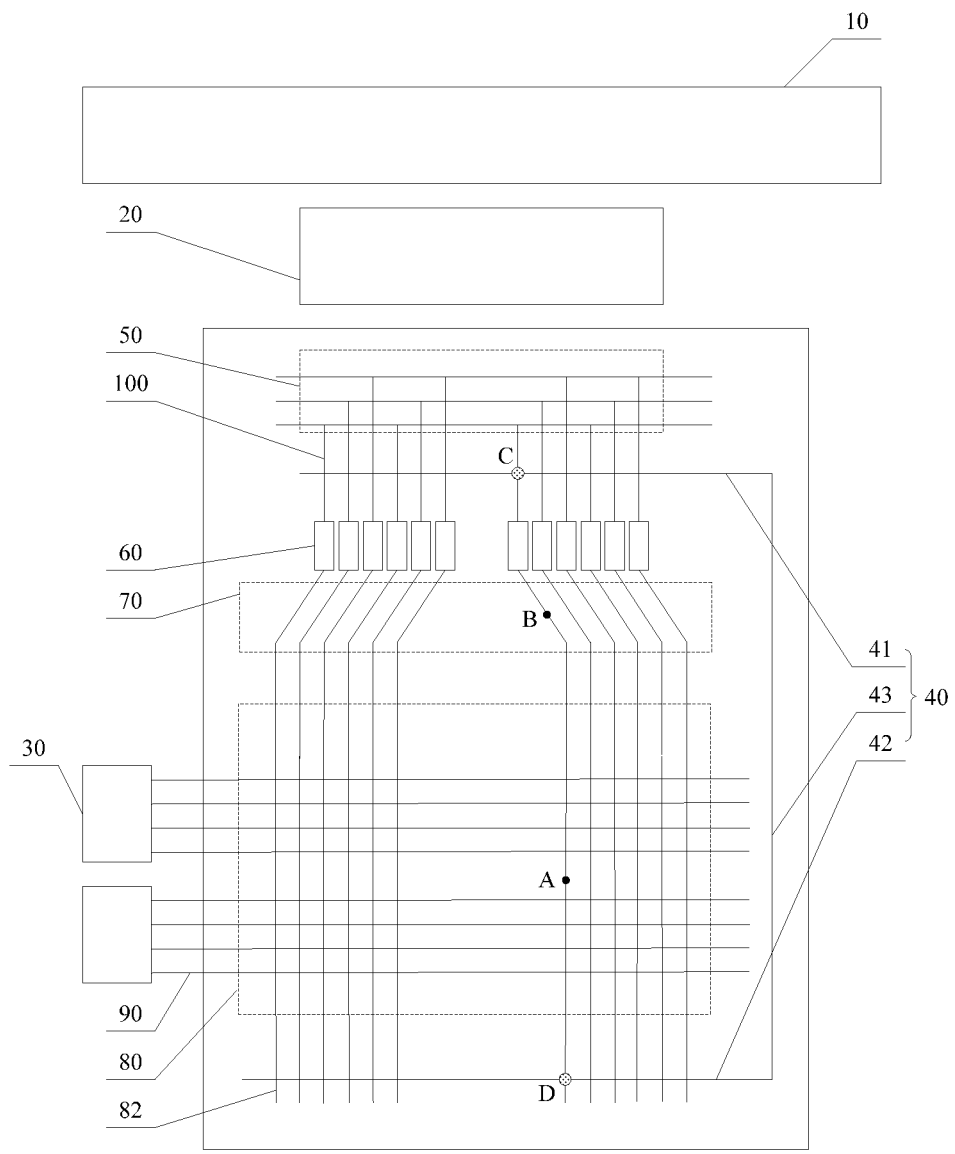
FIG. 1 is a schematic view of a liquid crystal display in accordance with a first embodiment of the present disclosure.

Referring to FIG. 1, which is a schematic view of a liquid crystal display in accordance with a first embodiment of the present disclosure. The liquid crystal display in the embodiment includes a printed circuit board 10, a data driving chip 20, a scanning driving chip 30, and a liquid crystal panel. The liquid crystal panel includes a repairing line 40, a short circuit bar area 50, a number of data line pads 60, a number of scanning line pads (not shown), a wiring area 70, a displaying area 80, a number of scanning lines 90, a number of data lines 82 passing through the displaying area 80 and the wiring area 70, and a number of testing lines 100 for connecting short circuit bars arranged on the short circuit bar area 50 and the data line pads 60 in the testing of the liquid crystal display. The data driving chip 20 is fixed on a first flexible circuit board (not shown) which is respectively connected to the printed circuit board 10 and the data line pads 60. The scanning driving chip 30 is respectively connected to the printed circuit board 10 and the scanning line pads through a second flexible circuit board (not shown). First ends of the data lines 82 are respectively electrically connected to the data line pads 60, and second ends of the data lines 82 extend to be located under the displaying area 80. The data lines 82 on the wiring area 70 are arranged on two metal layers, and the data lines 82 outside the wiring area 70 are arranged on one metal layer.

The repairing line 40 includes a first portion 41 isolably intersecting with the testing lines 100, a second portion 42 isolably intersecting with the second ends of the data lines 82, and a third portion 43 for connecting the first portion 41 and the second portion 42 when repairing a disconnected line. The first portion 41, the second portion 42, and the third portion 43 of the repairing line 40 are formed in a same photomask process, for example, are formed simultaneously with the scanning lines 90. At this situation, the three portions are connected to each other directly. The three portions of the repairing line may also be formed in different photomask processes, for example, the first portion 41, the second portion 42 and the scanning lines 90 are formed in the same photomask process, and the third portion 43 and the data lines are formed in the same photomask. At this state, the three portions are not connected to each other directly. Before repairing the disconnected line or when repairing the disconnected line, the three portions are connected to each other by through holes, allowing the three portions to be connected to each other when repairing the disconnected line. In other embodiment, the number of the repairing line can be more than two according to requirements.

In the embodiment, when one of the data lines 82 on the displaying area 80 is disconnected at a point A or one of the data lines 82 on the wiring area 70 is disconnected at a point B, a laser repairing machine is capable of connecting the first portion 41 of the repairing line 40 and the testing line 100 corresponding to the disconnected point at the intersection C thereof, and the laser repairing machine is further capable of connecting the second portion 42 of the repairing line 40 and the disconnected data line 82 at the intersection D thereof, thereby allowing the repairing line 40 to provide data signals for the data line located under the disconnected point A or B.

Compared to the liquid crystal display of the related art, the repairing line 40 of the liquid crystal display of the present disclosure includes the first portion 41 isolably intersecting with the testing lines 100, the second portion 42 isolably intersecting with the second ends of the data lines 82, and the third portion 43 connecting the first portion 41 and the second portion 42 when repairing the disconnected line, thus, not only the data lines 82 on the wiring area 70 of the liquid crystal panel can be repaired, but also the data lines 82 on the displaying area 80 of the liquid crystal panel can be repaired. Additionally, the repairing line 40 and the data lines 82 on the wiring area 70 are located at different positions, which allows the repairing line 40 to be formed in the same photomask process as the scanning lines 90 or data lines 82 on the displaying area 80 without requiring for extra photomask processes and without greatly increasing the manufacturing cost of the liquid crystal display.

Figure 2:
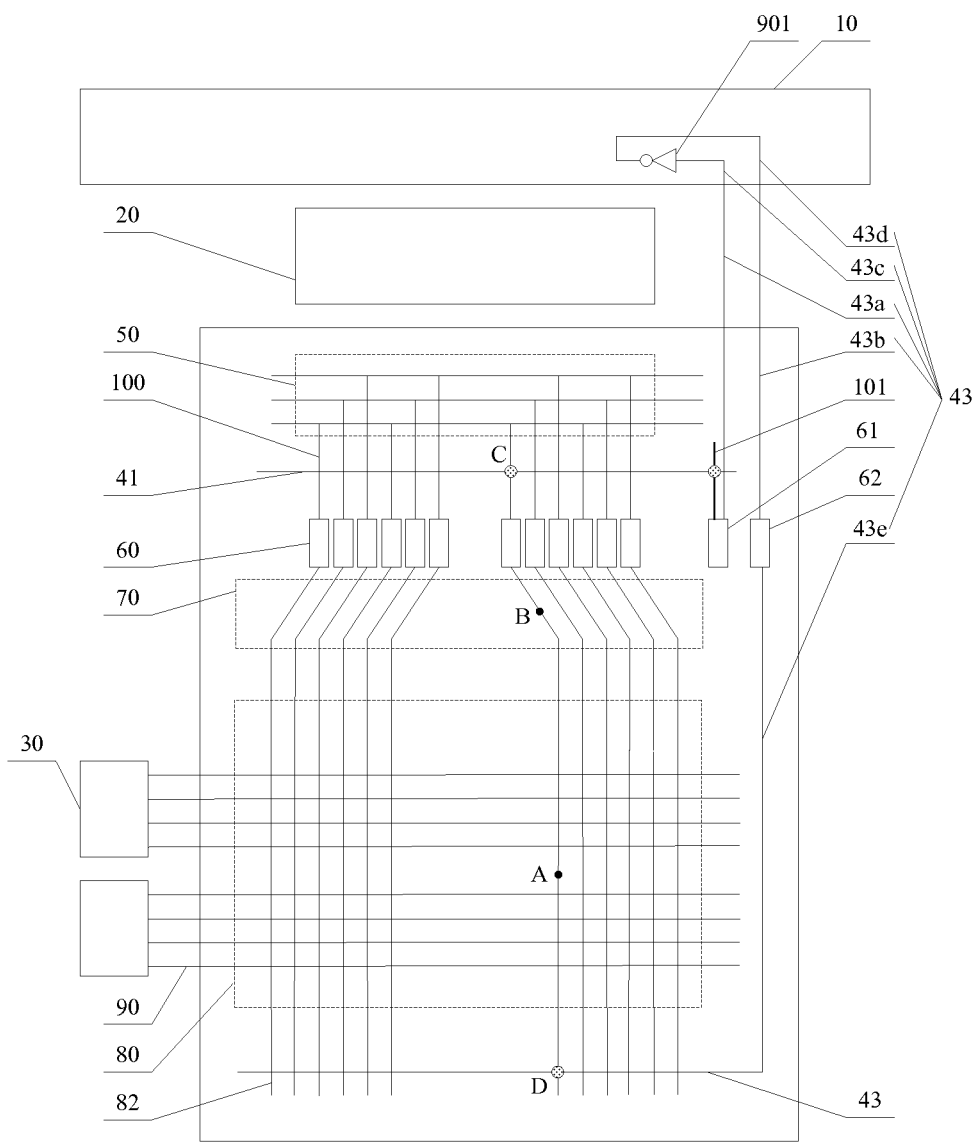
FIG. 2 is a schematic view of a liquid crystal display in accordance with a second embodiment of the second embodiment.

Referring to FIG. 2, which is a schematic view of a liquid crystal display in accordance with a second embodiment of the present disclosure. The liquid crystal display in the embodiment further includes an empty testing line 101, a first empty data line pad 61, and a second empty data line pad 62. The first empty data line pad 61 is electrically connected to the empty testing line 101. The first portion 41 of the repairing line 40 isolably intersects with the testing lines 100 and the empty testing line 101. The third portion 43 includes a first connecting line 43a, a second connecting line 43b, a third connecting line 43c, a fourth connecting line 43d, and a fifth connecting line 43e. The first connecting line 43a and the second connecting line 43b are respectively arranged on the first flexible printed circuit board, and the third connecting line 43c and the fourth connecting line 43d are respectively arranged on the printed circuit board 10. The first connecting line 43a is further connected the first empty data line pad 61 and the third connecting line 43c through the first flexible circuit board. The second connecting line 43b is connected to the second empty data line pad 62 and the fourth connecting line 43d through the first flexible circuit board. The third connecting line 43c is connected to the fourth connecting line 43d through a signal amplifier 901 on the printed circuit board 10. One end of the fifth connecting line 43e is connected to the second empty data line pad 62, and the other end thereof is connected to the second portion 42 of the repairing line 40. When repairing the disconnected line, the first portion 41 is connected to the testing lines 100 by forming through holes, the first portion 41 is connected to the empty testing line 101 by forming through holes, and the second portion 42 is connected to the data line 82 by forming through holes, thus, the first portion 41 is connected to the second portion 42 through the third portion 43, allowing the data signals on the testing lines 100 to be transmitted to the data lines on the displaying area 80 through the repairing line 40 to finish the repairing of the disconnected line.

It is noted that in the embodiment, when repairing the disconnected line, the first portion 41 of the repairing line 40 is connected to the empty testing line 101 by forming through holes. In other embodiments, on the premise of connecting the first portion 41 and the second portion 42 of the repairing line 40 through the third portion 43 during the repairing of the disconnected line, the first portion 41 and the empty testing line 101 can be connected to each other by forming through holes before the repairing of the disconnected line. In other embodiments, the number of the repairing line 40 can be more than two.

In the embodiment, after the data signals are transmitted to the third portion 43 and the third connecting line 43c through the first portion 41, the data signals are amplified by the signal amplifier 11 on the printed circuit board 10 and further transmitted to the second portion 42 of the repairing line 40 through the fourth connecting line 43d and the fifth connecting line 43e. The data signals are finally transmitted to the data line 82 through the second portion 42. Since the data signals are amplified, therefore, the weakening of the data signals in the transmission process can be prevented effectively to avoid a weak line of the data lines on the displaying area 80 or a displaying defect.

Specifically, the first portion 41 and the second portion 42 of the repairing line 40 are parallel to the scanning lines 90, and the third connecting line 43e of the third portion 43 is parallel to the data lines, which can improve the aesthetic of the overall arrangement and reduce the difficulty of the design.

The liquid crystal display of a third embodiment is similar to that of the second embodiment, and the difference therebetween lies that, the liquid crystal display of the third embodiment further includes at least one displaying area repairing line for repairing the disconnected data line on the displaying area. The displaying area repairing line includes a fourth portion, a fifth portion isolably intersecting with second ends of the data lines, and a sixth portion connecting the fourth portion and the fifth portion in the repairing. The fourth portion is arranged between the wiring area and the displaying area, and isolably intersects with the data lines. The displaying area repairing line uses the space between the wiring area and the displaying area to repair the data lines on the displaying area.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A liquid crystal display, comprising at least one repairing line, a short circuit bar area, a number of data line pads, a number of testing lines for connecting short circuit bars on the short circuit bar area and the data line pads, a wiring area, a displaying area, and a number of data lines passing through the wiring area and the displaying area; first ends of the data lines being electrically connected to the data line pads and second ends of the data lines extending to be located under the displaying area; wherein the repairing line comprises a first portion isolably intersecting with the testing lines, a second portion isolably intersecting with the second ends of the data lines, and a third portion connecting the first portion and the second portion when repairing a disconnected line.

2. The liquid crystal display of claim 1 further comprising a printed circuit board, a data driving chip, and a first flexible circuit board, and the data driving chip is electrically connected to the printed circuit board and the data line pads through the first flexible circuit board.

3. The liquid crystal display of claim 2 further comprising an empty testing line, a first empty data line pad, and a second empty data line pad; the first empty data line pad is electrically connected to the empty testing line; the first portion of the repairing line isolably intersects with the testing lines and the empty testing line, the third portion comprises a first connecting line, a second connecting line, a third connecting line, a fourth connecting line, and a fifth connecting line; the first connecting line and the second connecting line are respectively arranged on the first flexible circuit board, and the third connecting line and the fourth connecting line are respectively arranged on the printed circuit board; the first connecting line is connected to the first empty data line pad and the third connecting line through the first flexible circuit board, the second connecting line is connected to the second empty data line pad and the fourth connecting line through the first flexible circuit board, the third connecting line is connected to the fourth connecting line through a signal amplifier on the printed circuit board, and one end of the fifth connecting line is connected to the second empty data line pad and the other end thereof is connected to the second portion of the repairing line.

4. The liquid crystal display of claim 3, wherein the first portion and the second portion of the repairing line are parallel to the scanning lines, and the fifth connecting line of the third portion is parallel to the data lines.

5. The liquid crystal display of claim 1, wherein the first portion and the second portion of the repairing line and the scanning lines are formed in a same photomask process, the third portion and the data lines outside the displaying area are formed in the same photomask process, and the third portion connects the first portion and the second portion by forming through holes.

6. The liquid crystal display of claim 1, wherein the first portion, the second portion, and the third portion of the repairing line are formed in the same photomask process as the scanning lines, and the third portion connects the first portion and the second portion directly.

7. The liquid crystal display of claim 1, wherein the data lines on the wiring area are arranged on two metal layers, and the data lines outside of the wiring area are arranged on one metal layer.

8. A liquid crystal display, comprising at least repairing line, a short circuit bar area, a number of data line pads, a number of testing lines for connecting short circuit bars on the short circuit bar area and the data line pads on in test, a wiring area, a displaying area, a number of data lines passing through the wiring area and the displaying area; first ends of the data lines being electrically connected to the data line pads and second ends of the data lines extending to be located under the displaying area; wherein the repairing line comprises a first portion isolably intersecting with the testing lines, a second portion isolably intersecting with the second ends of the data lines, and a third portion connecting the first portion and the second portion when repairing a disconnected line; the liquid crystal display further comprises at least one displaying area repairing line which comprises a fourth portion, a fifth portion isolably intersecting with the second ends of the data lines, and a six portion connecting the fourth portion and the fifth portion in repairing; and the fourth portion is arranged between the wiring area and the displaying area and isolably intersects with the data lines.

9. The liquid crystal display of claim 8 further comprising a printed circuit board, a data driving chip, and a first flexible circuit board, and the data driving chip is electrically connected to the printed circuit board and the data lines through the first flexible circuit board.

10. The liquid crystal display of claim 9 further comprising an empty testing line, a first empty data line pad, and a second empty data line pad; the first empty data line pad is electrically connected to the empty testing line; the first portion of the repairing line isolably intersects with the testing lines and the empty testing line; the third portion comprises a first connecting line, a second connecting line, a third connecting line, a fourth connecting line, and a fifth connecting line; the first connecting line and the second connecting line are respectively arranged on the first flexible circuit board, the third connecting line and the fourth connecting line are respectively arranged on the printed circuit board, the first connecting line is connected to the first empty data line pad and the third connecting line through the first flexible circuit board, the second connecting line is connected to the second empty data line pad and the fourth connecting line through the first flexible circuit board, the third connecting line is connected to the fourth connecting line through a signal amplifier on the printed circuit board; and one end of the fifth connecting line is connected to the second empty data line pad and the other end thereof is connected to the second portion of the repairing line.

11. The liquid crystal display of claim 10, wherein the first portion and the second portion of the repairing line are parallel to the scanning lines, and the fifth connecting line of the third portion is parallel to the data lines.

12. The liquid crystal display of claim 8, wherein the first portion and the second portion of the repairing line and the scanning lines are formed in a same photomask process, the third portion and the data lines outside the displaying area are formed in the same photomask process, and the third portion connects the first portion and the second portion by forming through holes.

13. The liquid crystal display of claim 8, wherein the first portion, the second portion, and the third portion of the repairing line are formed in the same photomask process as the scanning lines, and the third portion connects the first portion and the second portion directly.

14. The liquid crystal display of claim 8, wherein the data lines on the wiring area are arranged on two metal layers, and the data lines outside of the wiring area are arranged on one metal layer.

* * * * *